United States Patent
Poeluev et al.

(10) Patent No.: US 9,733,992 B1
(45) Date of Patent: Aug. 15, 2017

(54) INTER-PROCESS COMMUNICATION BETWEEN CONTAINERS

(71) Applicant: Huawei Technologies Co., Ltd., Shenzhen (CN)

(72) Inventors: Yuri Poeluev, Petersburg (CA); Raghu Sesha Iyengar, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/167,566

(22) Filed: May 27, 2016

(51) Int. Cl.
 *G06F 13/00* (2006.01)
 *G06F 9/54* (2006.01)
 *G06F 21/57* (2013.01)

(52) U.S. Cl.
 CPC ............... *G06F 9/54* (2013.01); *G06F 21/57* (2013.01); *G06F 2221/034* (2013.01)

(58) Field of Classification Search
 CPC ...................................................... G06F 9/546
 USPC ........................................................ 719/313
 See application file for complete search history.

(56) References Cited

U.S. PATENT DOCUMENTS

| 8,505,006 | B1* | 8/2013 | Larkin | G06F 9/45537 718/1 |
| 2007/0130366 | A1* | 6/2007 | O'Connell | H04L 45/586 709/238 |
| 2014/0003432 | A1* | 1/2014 | Haserodt | H04L 69/04 370/392 |
| 2015/0074684 | A1 | 3/2015 | Goldstein et al. | |
| 2016/0283261 | A1* | 9/2016 | Nakatsu | G06F 9/45558 |
| 2017/0031697 | A1* | 2/2017 | Lee | G06F 9/45545 |

OTHER PUBLICATIONS

"Cells: Lightweight Virtual Smartphones," Software Systems Laboratory, Columbia University Department of Computer Science, http://systems.cs.columbia.edu/projects/cells/, downloaded Aug. 29, 2016, 3 pages.

* cited by examiner

*Primary Examiner* — Andy Ho
(74) *Attorney, Agent, or Firm* — Slater Matsil, LLP

(57) ABSTRACT

The present disclosure provides systems, methods, and computer-readable media for mediating communications between two processes not running in a common container. A request from a requesting process running in a first container to communicate with one or more target processes outside the first container is received, and a device file accessible to the first container is created. The inter-container communication is then routed from the requesting process through the created device file, and on to the target process.

20 Claims, 12 Drawing Sheets

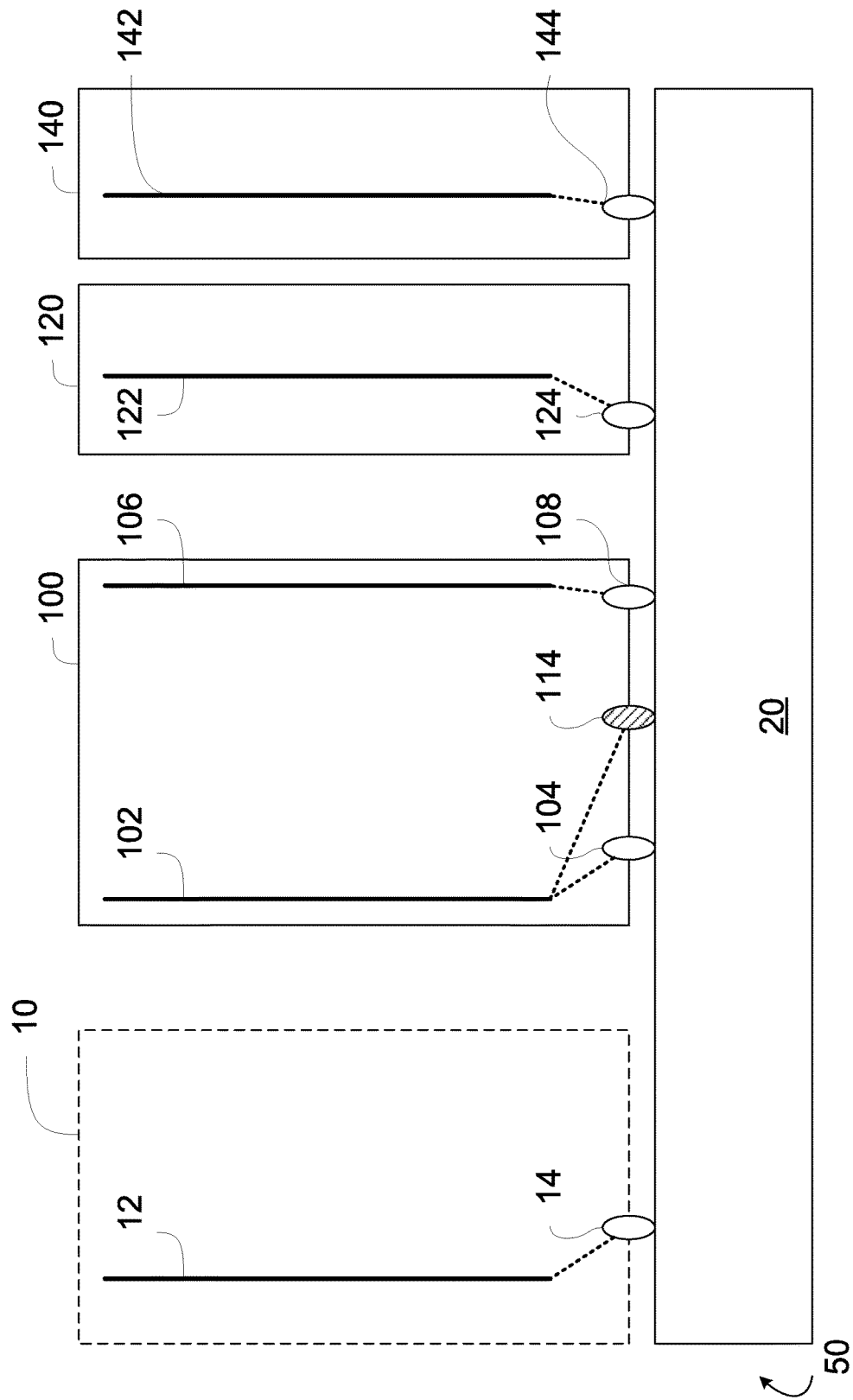

INTER-PROCESS COMMUNICATION BETWEEN CONTAINERS

TECHNICAL FIELD

The present disclosure relates generally to containers, and more specifically to techniques for handling inter-process communications between containers.

BACKGROUND

An operating-system-level virtualization method is a method of running an isolated user-space instance, sometimes called a container, on a "host" computing system. A particular host computing system may run multiple containers at any given time. Each container is allocated a respective amount of computing resources, including processor cycles, memory, and the like, to emulate a particular set of hardware running a particular operating system and being configured to execute a particular set of software.

A container can run any suitable number of processes, including computer programs, scripts, and services. During use, the host computing system is transparent to the user of the container. In certain instances, a requesting process may wish to communicate with a target process. If both processes are in the same container, the operating system run by the container may mediate the communication in any suitable conventional manner. However, if the requesting and target processes are in different containers, the host computing system must mediate the communication. Although certain existing techniques, such as the use of sockets and pipes, can be used by the host computing system, these techniques have significant security vulnerabilities as a result of combining intra-container and inter-container communications.

As such, there is a need for a method for mediating inter-container communications with improved security.

SUMMARY

The present disclosure provides systems, methods, and computer-readable media for mediating communications between two processes not running in a common container. A request from a requesting process running in a first container to communicate with one or more target processes outside the first container is received, and a device file accessible to the first container is created. The inter-container communication is then routed from the requesting process through the created device file, and on to the target process.

In accordance with a broad aspect, there is provided a method for inter-process communication, comprising: receiving a request from a requesting process running in a first container for communicating with at least one target process outside of the first container, the requesting process using a first device file; creating a second device file accessible by the first container; and routing a communication from the requesting process to the at least one target process outside of the container through the second device file.

In some embodiments, the method further comprises modifying an entry of an access control database associated with the second device file.

In some embodiments, the method further comprises associating at least one security policy with the second device file.

In some embodiments, the second device file is accessible to the at least one target process.

In some embodiments, the at least one target process is running in one of a root container and a host operating system.

In some embodiments, the at least one target process outside of the first container comprises a plurality of target processes, and routing comprises routing the communication to the plurality of target processes through the second device file.

In some embodiments, the plurality of target processes are running in a second container.

In some embodiments, at least a first target process of the plurality of target processes is running in a second container and at least a second target process of the plurality of target processes is running in a third container.

In some embodiments, the first container is one of a plurality of containers belonging to a container family, and the second device file is accessible to the plurality of containers belonging to the container family.

In some embodiments, the method further comprises creating a matching requesting process in the first container and associated with the requesting process, the matching requesting process using the second device file, wherein routing a communication from the requesting process to the at least one target process outside of the container comprises routing the communication through the matching requesting process.

According to another broad aspect, there is provided a system for inter-process communication. The system comprises a processing unit and a non-transitory memory communicatively coupled to the processing unit and comprising computer-readable program instructions. The program instructions are executable by the processing unit for receiving a request from a requesting process running in a first container for communicating with at least one target process outside of the first container, the requesting process using a first device file; creating a second device file accessible by the first container; and routing a communication from the requesting process to the at least one target process outside of the container through the second device file.

In some embodiments, the program instructions are further executable for modifying an entry of an access control database associated with the second device file.

In some embodiments, the program instructions are further executable for associating at least one security policy with the second device file.

In some embodiments, the second device file is accessible to the at least one target process.

In some embodiments, the at least one target process is running in one of a root container and a host operating system.

In some embodiments, the at least one target process outside of the first container comprises a plurality of target processes, and routing comprises routing the communication to the plurality of target processes through the second device file.

In some embodiments, the plurality of target processes are running in a second container.

In some embodiments, at least a first target process of the plurality of target processes is running in a second container and at least a second target process of the plurality of target processes is running in a third container.

In some embodiments, the first container is one of a plurality of containers belonging to a container family, and the second device file is accessible to the plurality of containers belonging to the container family.

In some embodiments, the program instructions are further executable for creating a matching requesting process in the first container and associated with the requesting process, the matching requesting process using the second device file, wherein routing a communication from the requesting process to the at least one target process outside of the container comprises routing the communication through the matching requesting process.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which:

FIGS. 5A-C, 6A-B, 7A-B, and 8 are block diagrams of the example container management system of FIG. 1 after execution of the method of FIG. 4.

It will be noted that throughout the appended drawings, like features are identified by like reference numerals.

DETAILED DESCRIPTION OF ILLUSTRATIVE EMBODIMENTS

Inter-process communication, or IPC, refers to the exchange of messages between different processes. In a container scenario, processes in different containers can exchange IPCs. However, exchanging IPCs across containers using the same resource interfaces as are used to exchange IPCs within a container can lead to security vulnerabilities. Therefore, the present disclosure proposes the use of separate resource interfaces when exchanging IPCs across containers.

Figure 1:
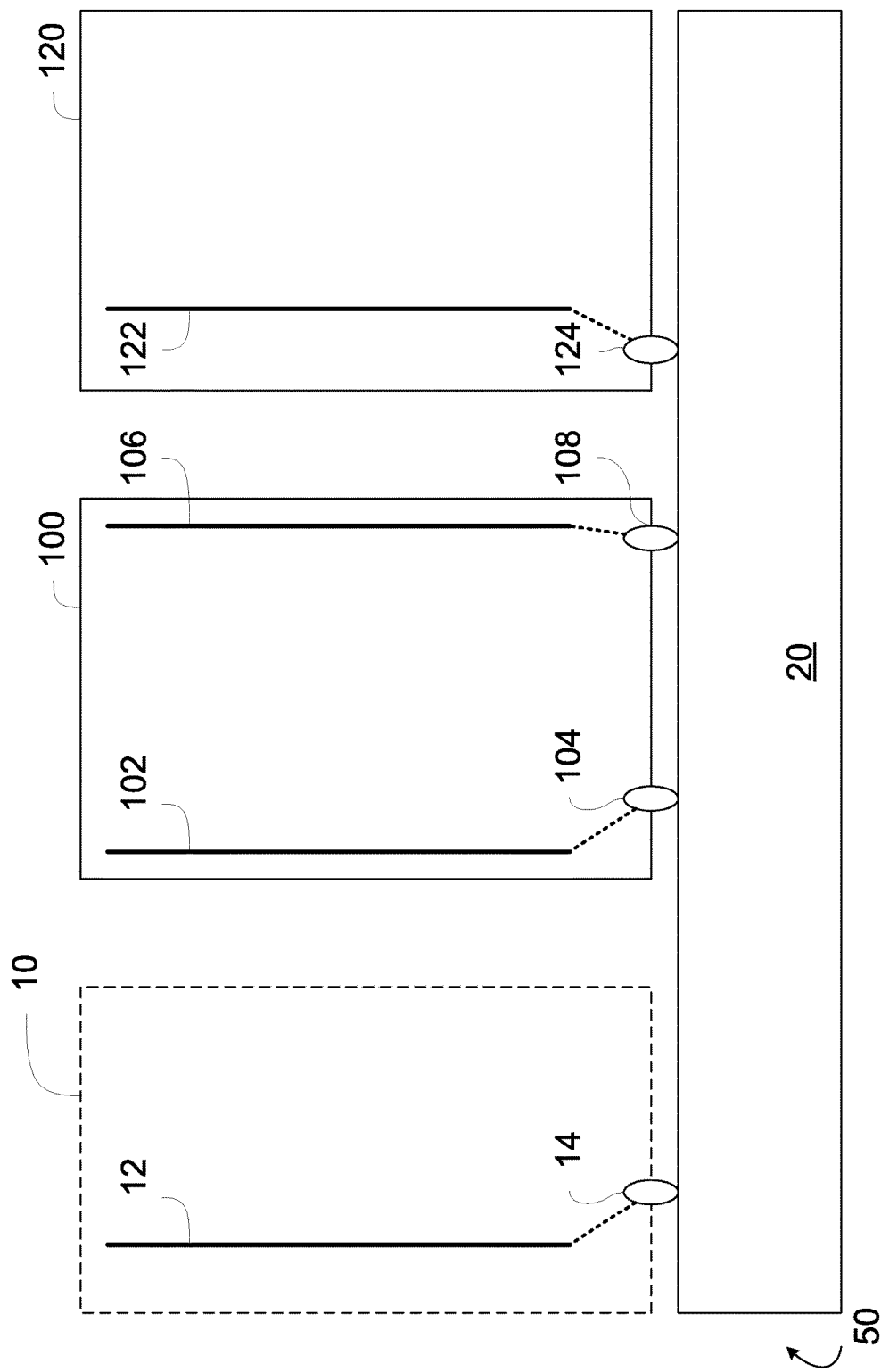
FIG. 1 is a block diagram of an example container management system.

With reference to FIG. 1, an example container management system 50 includes an operating system kernel 20 which implements a root container 10. Root container 10 is configured for running at least one process 12, such as a master process, which uses a device file 14. The root container 10 is also configured to instantiate and run additional containers, including a first container 100 and a second container 120, for example by way of the master process 12. In some embodiments, the master process 12 is a host operating system which runs on the operating system kernel 20. In other embodiments, the host operating system runs on the operating system kernel 20 outside the root container 10, and the master process 12 manages containers separately from the host operating system. The first container 100 is configured for running process 102, which uses device file 104; and process 106, which uses device file 108. The second container 120 is configured for running process 122, which uses device file 124. In general, the first and second containers 100, 120, are each configured for running at least one process 102, 106, 122.

Figure 2:
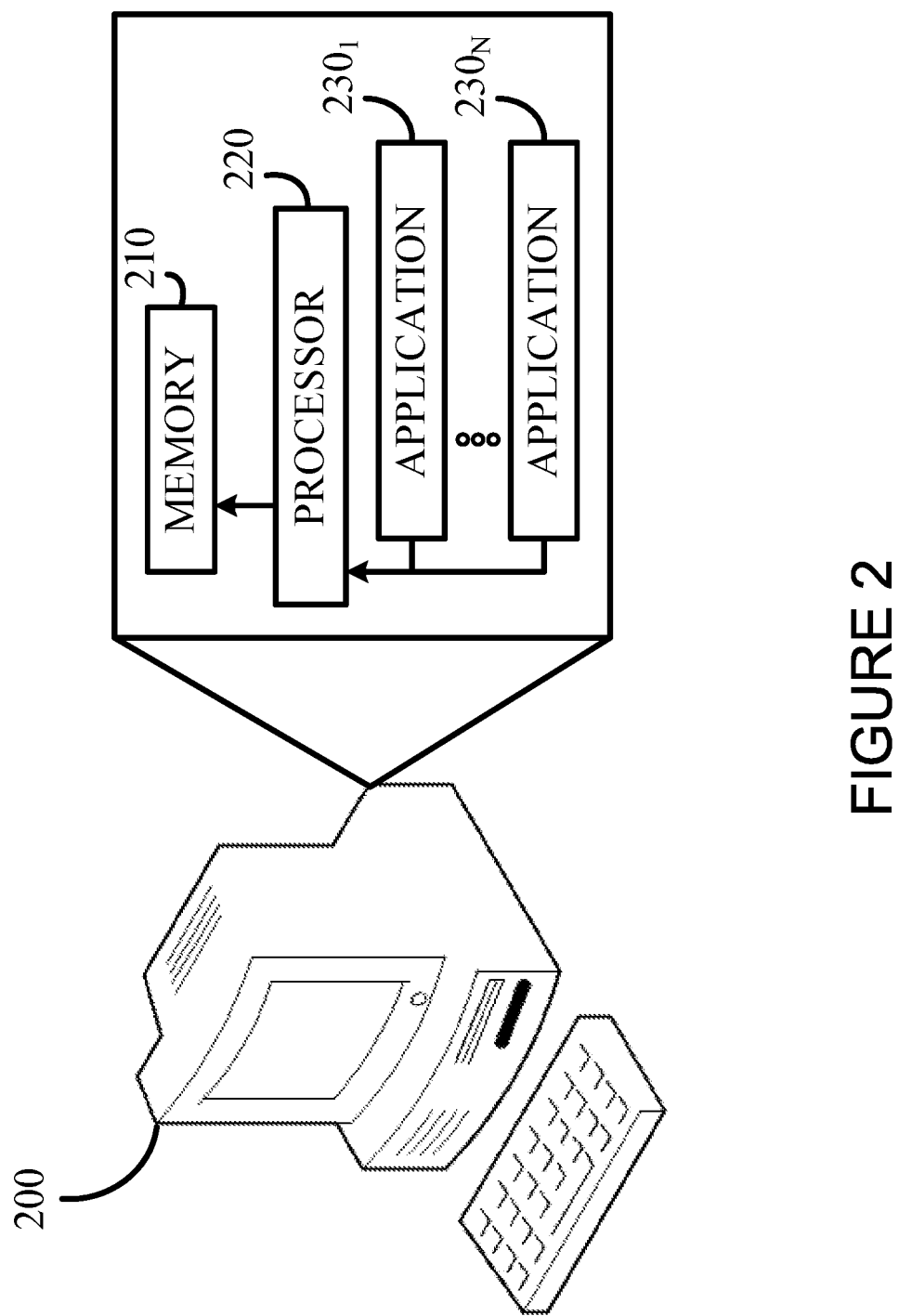
FIG. 2 is a block diagram of an example computing system implementing the system of FIG. 1.

With reference to FIG. 2, the container management system 50 may be implemented on any suitable computing device 200, including mainframes, servers, desktops, laptops, ultra-portables, tablets, phablets, smartphones, personal digital assistants, any other suitable mobile device, and the like. The computing device implementing the container management system 50 has hardware suitable for running a variety of programs, including the operating system kernel 20, the container management system 50, and one or more containers. The hardware of the computing device 200 includes one or more processors 220, one or more memories 310 which store a plurality of applications $230_1$-$230_N$ for execution by the processors 220, and may include one or more devices and/or peripherals (not illustrated). One or more of the applications $230_1$-$230_N$ are configured for implementing the container management system 50.

With continued reference to FIG. 1, in some embodiments, the container management system 50 is implemented at the level of the operating system kernel 20. In some embodiments, the container management system 50 is implemented on smartphones, featurephones, phablets, tablets, wearables, and other mobile electronic devices running mobile operating systems. For example, the container management system 50 is implemented as part of the Android™ mobile operating system and uses the Binder IPC Framework.

The operating system kernel 20 can be any kernel suitable for interfacing between the hardware of the container and the applications running thereon, including the root container 10, the host operating system, and the first and second containers 100, 120. The operating system kernel 20 is configured for allocating computing resources to the containers 10, 100, 120 based on a variety of factors, including the availability of resources and the resource demands of the containers 10, 100, 120. The operating system kernel 20 is also configured for receiving IPCs and for routing the IPCs from one process to another, some aspects of which are discussed herein below. Alternatively, the master process 12 is configured for allocating computing resources to the containers 100, 120, and is configured for receiving and routing IPCs.

The processes 12, 102, 106, 122 can be processes for any type of software application, including computer programs, scripts, services, and the like. Each process 12, 102, 106, 122 uses a respective device file 14, 104, 108, 124 during execution. A device file provides an interface for the process to access the computing resources allocated to the container in which the process is being executed. In some cases, a plurality of processes share a common device file, for example when the plurality of processes are using a similar or identical set of computing resources. In other cases, each process is assigned a respective device file that is not shared with any target process. In some embodiments, the device files 14, 104, 108, 124 are hardware-based device files. In other embodiments, the device file 14, 104, 108, 124 are virtual device files. The device files 14, 104, 108, 124, whether hardware-based or virtual, appear the same to the processes 12, 102, 106, 122, so that the processes 12, 102, 106, 122 cannot distinguish between hardware-based device files and virtual device files.

The root container 10, or the host operating system, serves as a parent within which child containers, such as containers 100 and 120, are instantiated and run. In some embodiments, the root container 10 is configured to run processes, such as the master process 12. In other embodiments, the root container 10 runs no processes. The root container 10, or the host operating system, is configured for receiving instructions, for example from the operating system kernel 20, for instantiating additional containers, for allocating and deallocating computing resources to containers, and for suspending, resuming, or removing containers. In some embodiments, containers are instantiated and resources are allocated as a part of an initialization or boot process of a device on which the container management system 50 is implemented. The containers 100, 120 are thus allocated respective computer resources and are configured to execute processes, such as the processes 102, 106, 122, which use device files 104, 108, 124. In some embodiments, a given process uses more than one device file.

Figure 3:
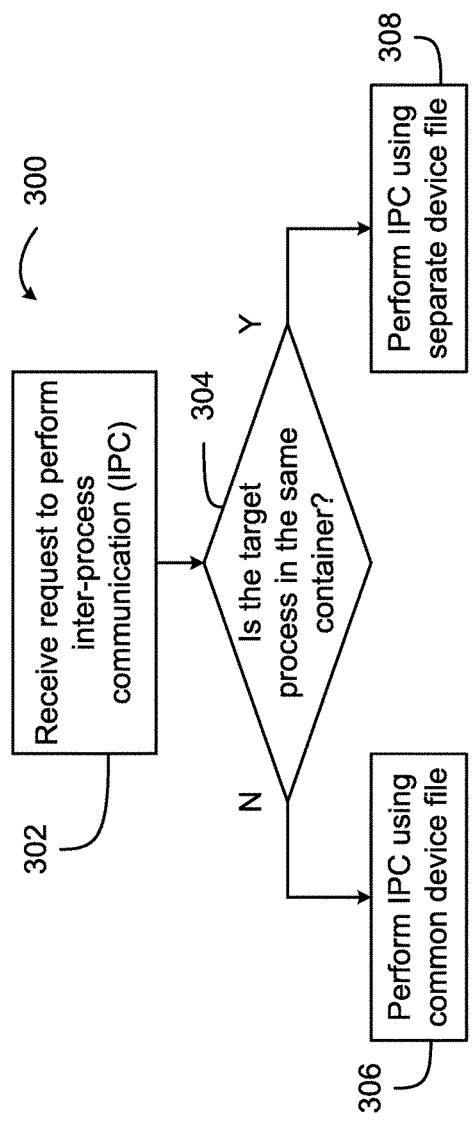
FIG. 3 is a flowchart of a method for determining the routing path for an inter-process communication in accordance with an embodiment.

Any given process, for example the process 102, may, at certain times or based on certain conditions, output a request for IPC to communicate with a given target process, for example the process 106 or the process 122. The request can be provided in any suitable format and using any suitable protocol. In some embodiments, the request for IPC is sent from the requesting process 102 to a controller (not illustrated) of the container 100 in which the requesting process 102 is being run. In other embodiments, the request for IPC is sent via the device file 104 to the operating system kernel 20, or to a communication arbiter thereof (not illustrated). In further embodiments, the request for IPC is sent from the requesting process 102 to the root container 10, or to the host operating system. With reference to FIG. 3, a recipient of the request implements a method 300 for determining how to process the IPC. At step 302, the request for IPC is received from the requesting process 102. The request may be received by the container 100 in which the process 102 is run, the operating system kernel 20, or any other suitable element of the container management system 50.

At step 304, the recipient of the request determines whether the target process is in the same container as the requesting process. To determine the target process, the recipient may inspect the request to compare, for example, an identifier of the container from which the request originates and an identifier of the container of the destination process. If the identifiers match, the recipient determines that the target process is in the same container as the requesting process and the method moves to step 306. If the identifiers do not match, the recipient determines that the target process is in a different container than the requesting process and the method moves to step 308. The determination of whether the target process is in the same container as the requesting process can also be performed in other ways.

When the method moves to step 306, for example if the target process is the process 106, the IPC is routed from the requesting process 102 to the target process 106 using the device file 104. Because the requesting process 102 and the target process 106 are in the same container 100, this communication is called an intra-container IPC.

When the process moves to step 308, for example if the target process is the process 122, the IPC is routed from the requesting process 102 to the target process 122 using a separate device file. Because the requesting process 102 and the target process 122 are in different containers 100, 120, this communication is called an inter-container IPC.

Figure 4:
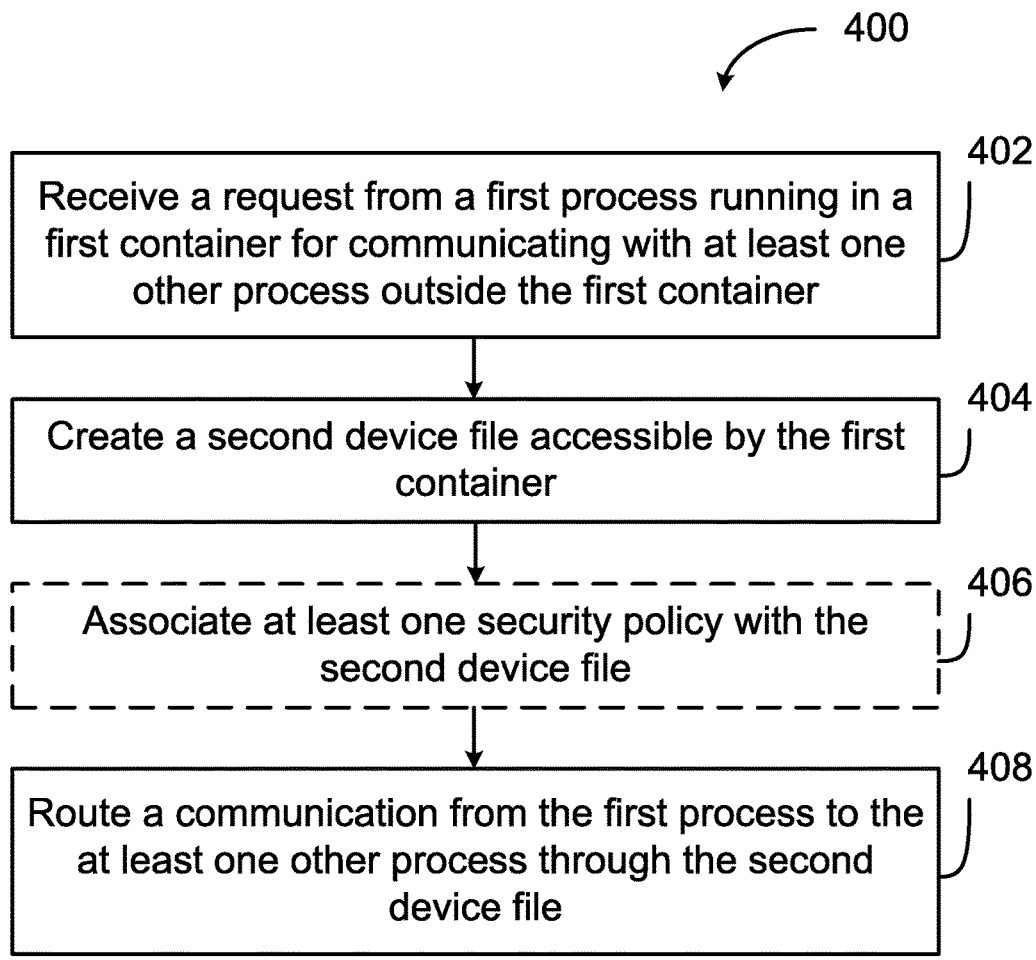
FIG. 4 is a flowchart of a method for routing an inter-process communication in accordance with an embodiment.

With reference to FIG. 4, there is shown a method 400 for implementing inter-container IPCs. At step 402, a request is received from a requesting process running in a first container for communicating with at least one target process outside the first container, for example process 122 running in container 120. The requesting process, for example process 102, uses a first device file 104, and sends the request for IPC. The request may be provided in any suitable format, and may include any suitable information for routing the IPC. For example, the request contains an identifier of the requesting process 102, the device file 104 and/or the container 100 from which the request originates, an identifier of the target process 122, the device file 124 used by the target process 122, the container 120 in which the target process 122 is run, and the like. In some embodiments, the request also contains a message or other communication to be routed from the requesting process 102 to the target process 122.

Figure 5A:
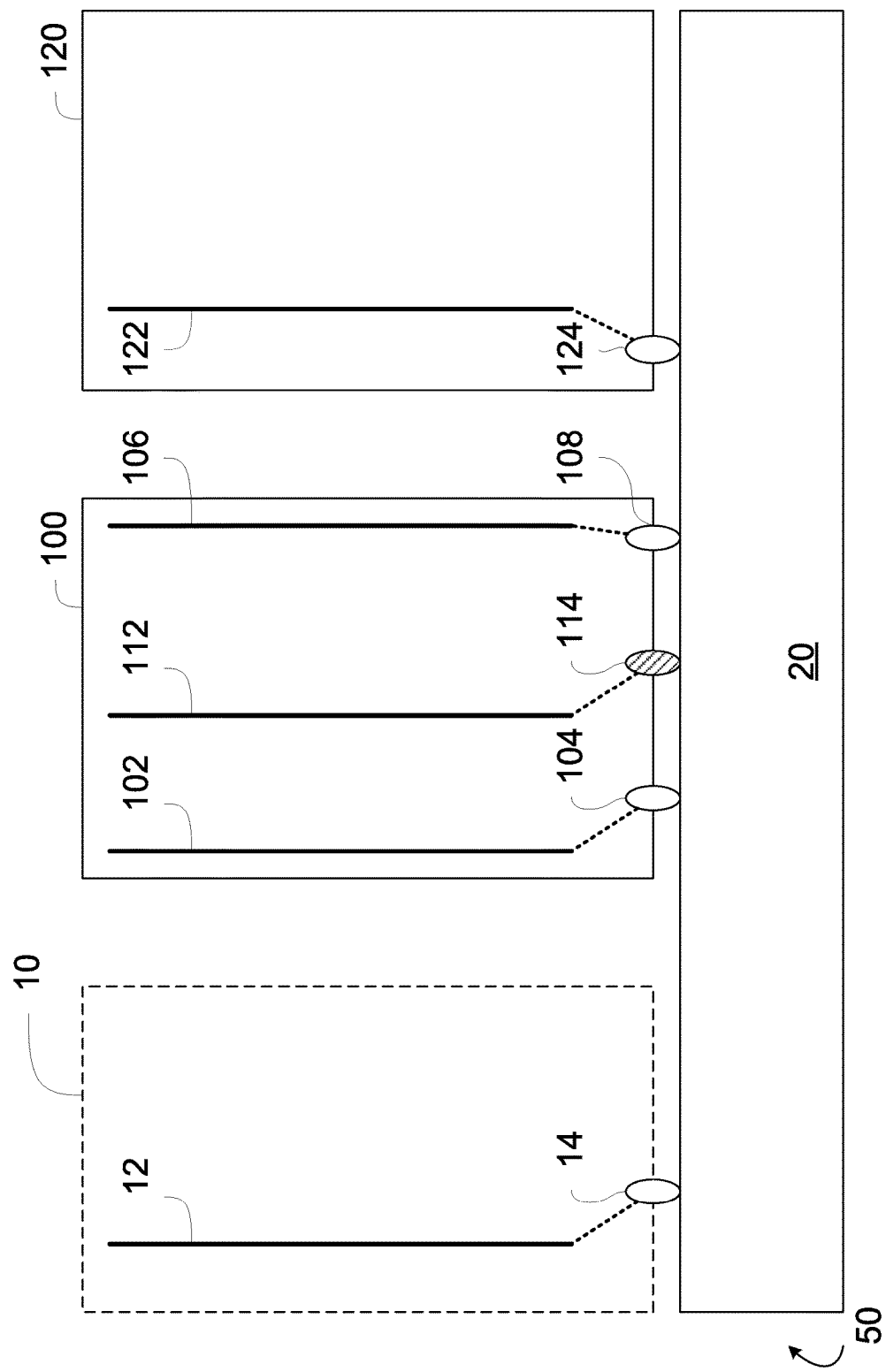
Figure 5B:
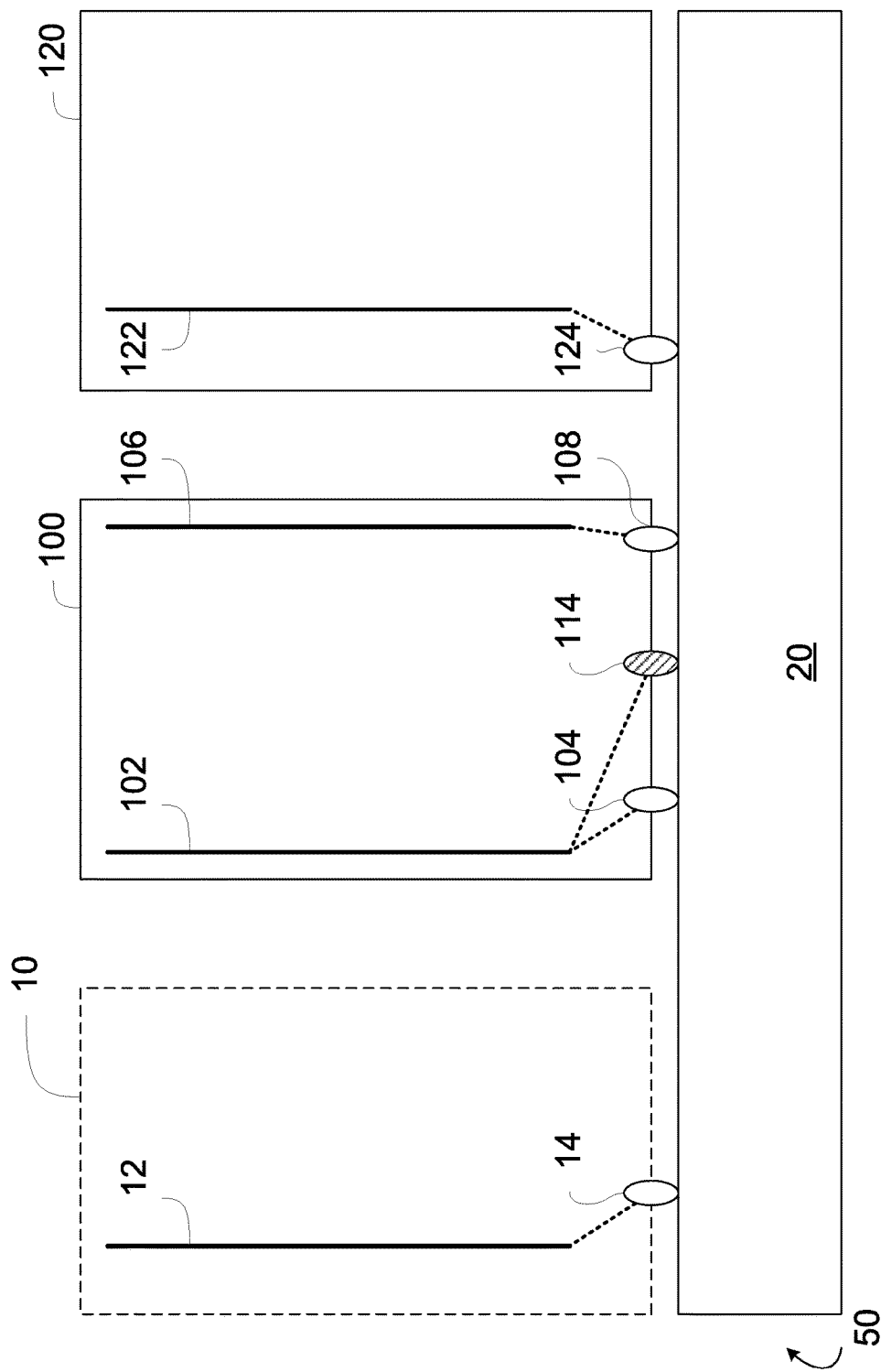

At step 404, a second device file accessible by the first container is created. With reference to FIG. 5A, there is shown the container management system 50 after completion of step 404, where a second device file 114 has been created. In some embodiments, the second device file 114 is similar to the first device file 104. The second device file 114 is accessible to the first container 100. In some embodiments, a matching requesting process 112 is executed in the first container 100 and uses the second device file 114. The matching requesting process 112 may be similar to the requesting process 102, or may vary from the requesting process 102 in any suitable way. Thus, in some embodiments, the matching requesting process 112 and the second device file 114 act as copies of the requesting process 102 and the first device file 104. With reference to FIG. 5B, in other embodiments, the second device file 114 is used by the requesting process 102, and no matching requesting process 112 is created.

The second device file 114 is created using suitable device file creation methods. In some embodiments, the container 100 or a controller thereof (not pictured) creates the second device file 114. In other embodiments, the second device file 114 is created by the root container 10, by the host operating system, or by the operating system kernel 20. In further embodiments, the second device file 114 is created by another suitable entity. In some embodiments, the second device file 114 is created in response to the receipt of the request at step 402. In other embodiments, the second device file 114 is created upon instantiation of the container 100, or in response to another suitable event or trigger. Thus, in some embodiments, the first and second device files 104, 114, are created prior to any processes, such as the process 102, running in the container 100.

In some embodiments, one or more security measures govern the transmission of IPCs, and optionally the method 400 comprises a step 406 of associating at least one security policy with the second device file. For example, the operating system kernel 20 can have an access control database and/or one or more security policies which limit IPCs. Thus, an entry of the access control database associated with the second device file 114 can be modified to indicate to the operating system kernel 20 that the second device file 114 is allowed to send inter-container IPCs. Alternatively, a security policy is associated with the second device file to indicate to the operating system kernel 20 that the second device file 114 is allowed to send inter-container IPCs. In some embodiments, the security measures are mandatory and applied to every process, and in other embodiments the security measures are discretionary. For example, the access control database has stored therein a list of applications for which security measures are to be applied, and the security measures are applied to applications which are present in the list. The security measures can be applied, for example, on the basis of a process ID or other identifier of the requesting process 102.

Figure 5C:
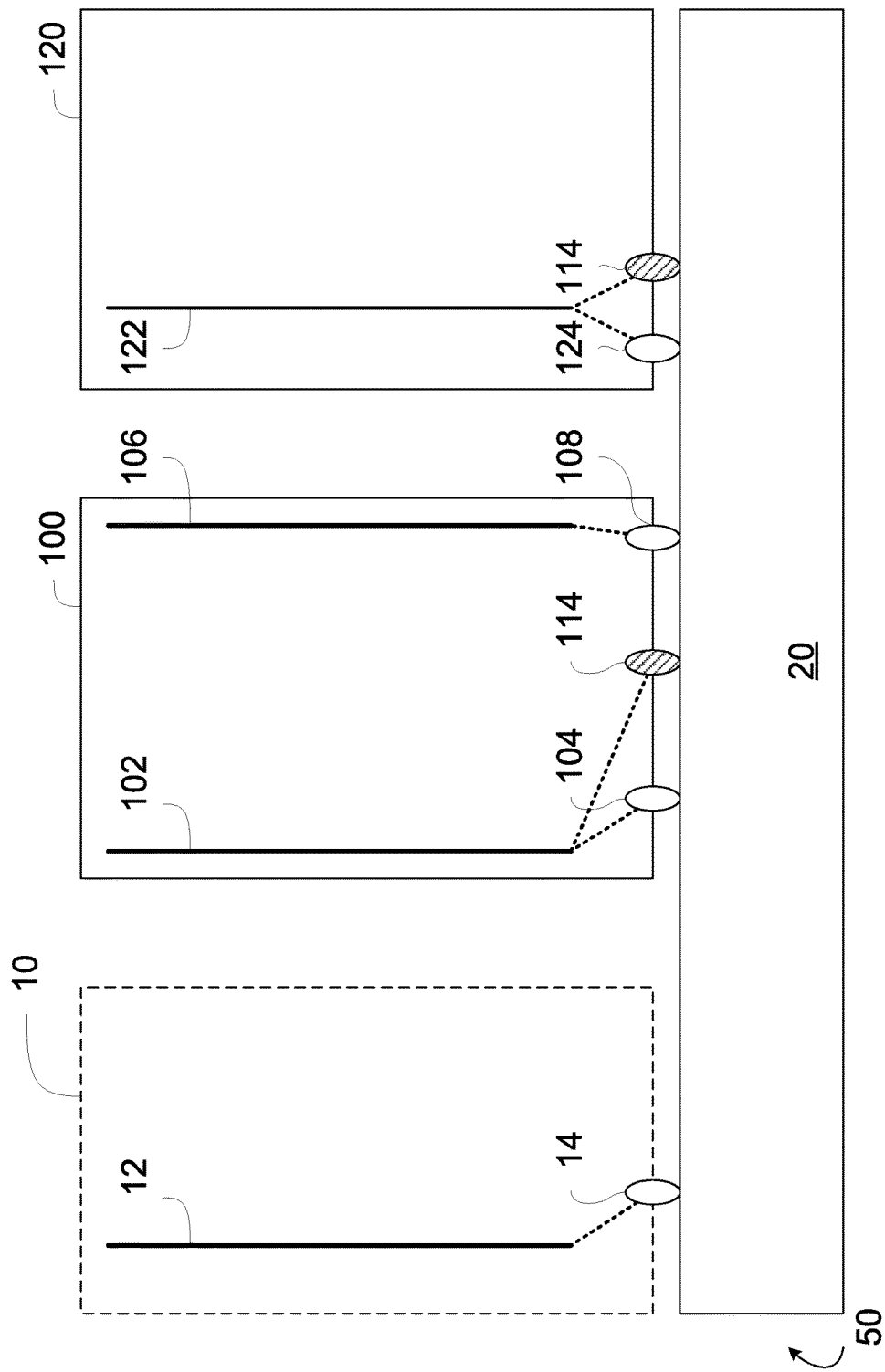

At step 408, the IPC is routed from the requesting process 102 to the target process 122 through the second device file 114. The routing may be mediated by the root container 10, the host operating system, and/or the operating system kernel 20, or by any other element of the container management system 50. With reference to FIG. 5C, in some embodiments the device file 124 used by the target process 122 is not configured for use with inter-container IPCs. Thus, the second device file 114 can be configured to be used by the target process 122 in order to route the IPC from the requesting process 102 to the target process 122.

Figure 6A:
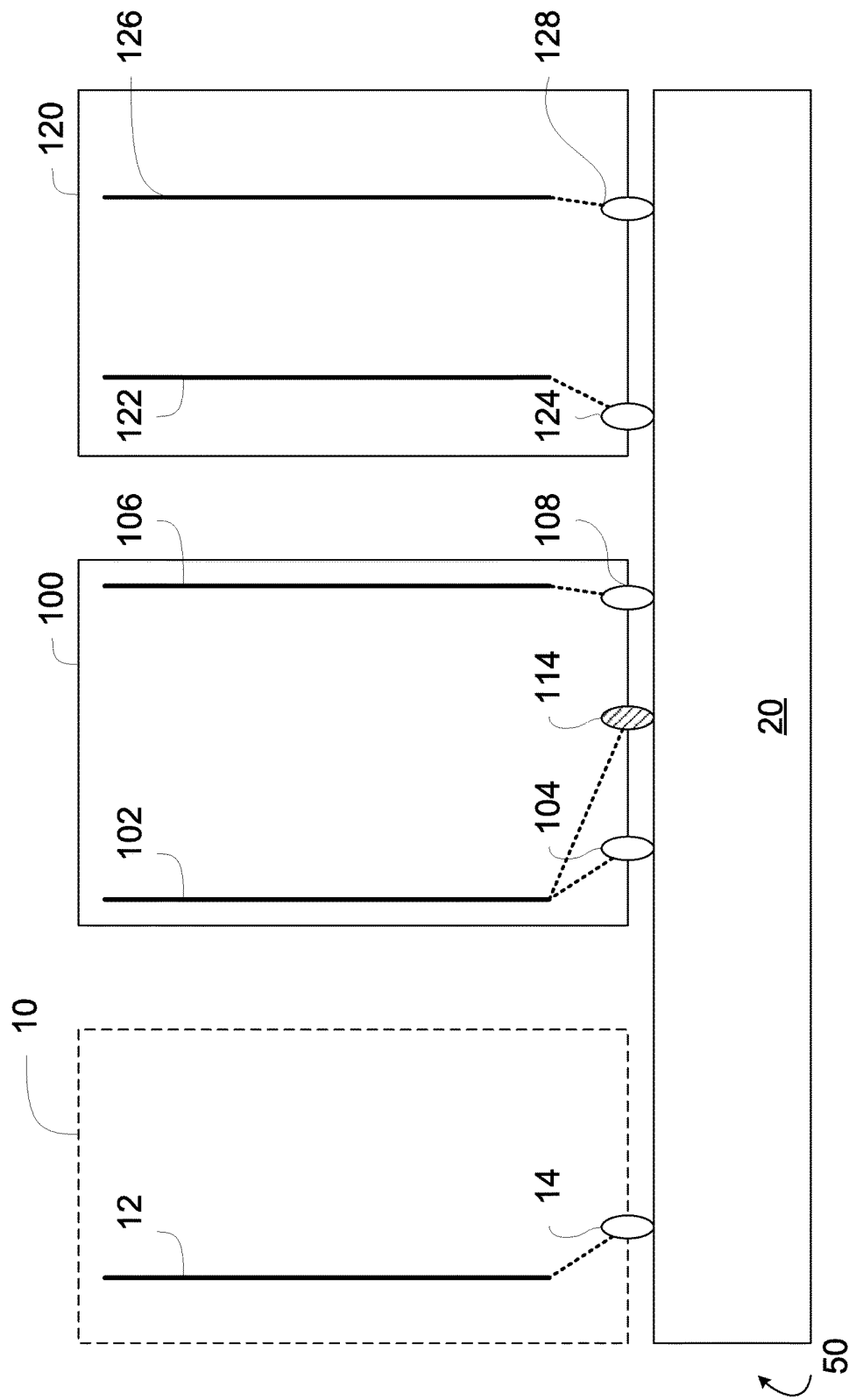
Figure 6B:
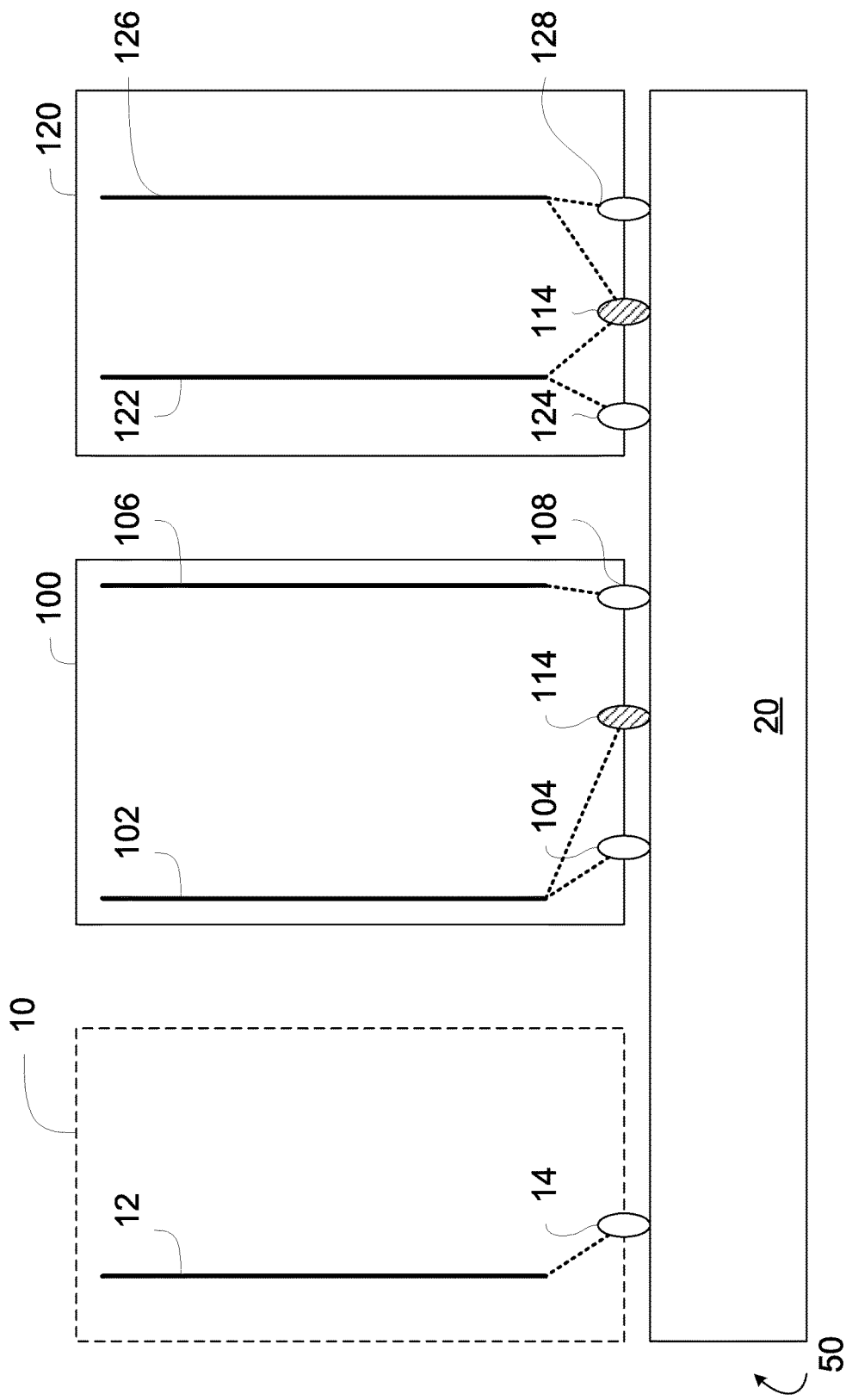

In some embodiments, the request for IPC indicates that the requesting process 102 is requesting to communicate with a plurality of target processes outside the first container 100. In this embodiment, at step 408, the IPC is routed to each of the plurality of target processes outside the first container 100 through the second device file 114. With reference to FIGS. 6A-B, if the target process outside the first container is a plurality of target processes 122, 126, as illustrated in FIG. 6A, the second device file 114 can be configured to be used by the plurality of target processes 122, 126, as illustrated in FIG. 6B.

The second device file 114 created at step 404 is separate from the first device file 104, and serves to route inter-container IPCs. Thus, IPC routing for the requesting process 102 is segregated: intra-container IPCs are routed through the first device file 104, and inter-container IPCs are routed through the second device file 114.

Figure 7B:
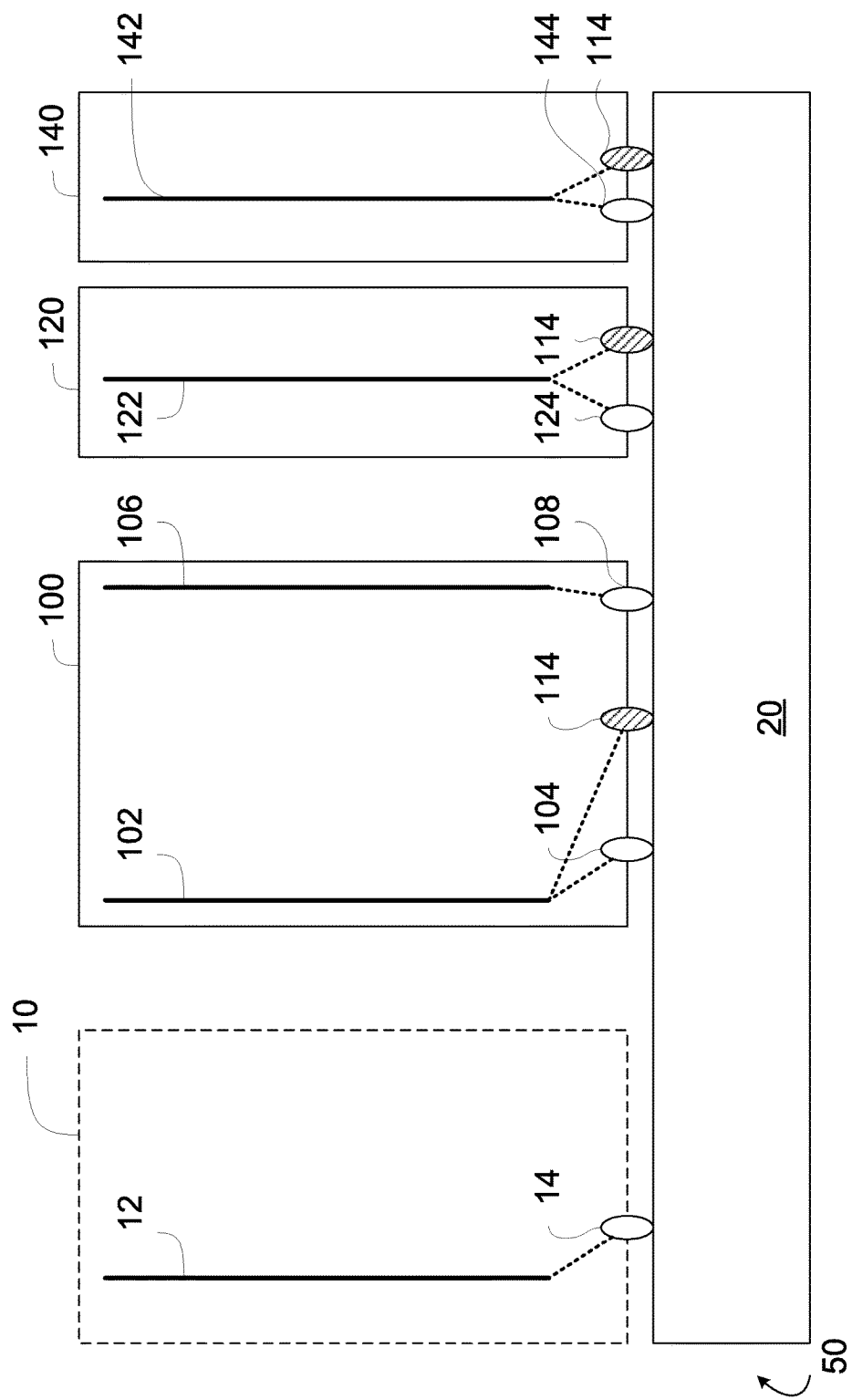

With reference to FIG. 7A, in some embodiments, the at least one target process outside the first container includes a process 122 in a second container 120 using device file 124 and a process 142 inside a third container 140 using device file 144. In this embodiment, the second device file 114 is configured to be used by both the target process 122 in container 120 and the target process 142 inside the container 140, as illustrated in FIG. 7B. At step 408, the IPC is routed to both the second container 120 and the third container 140 via the second device file 114.

Figure 8:
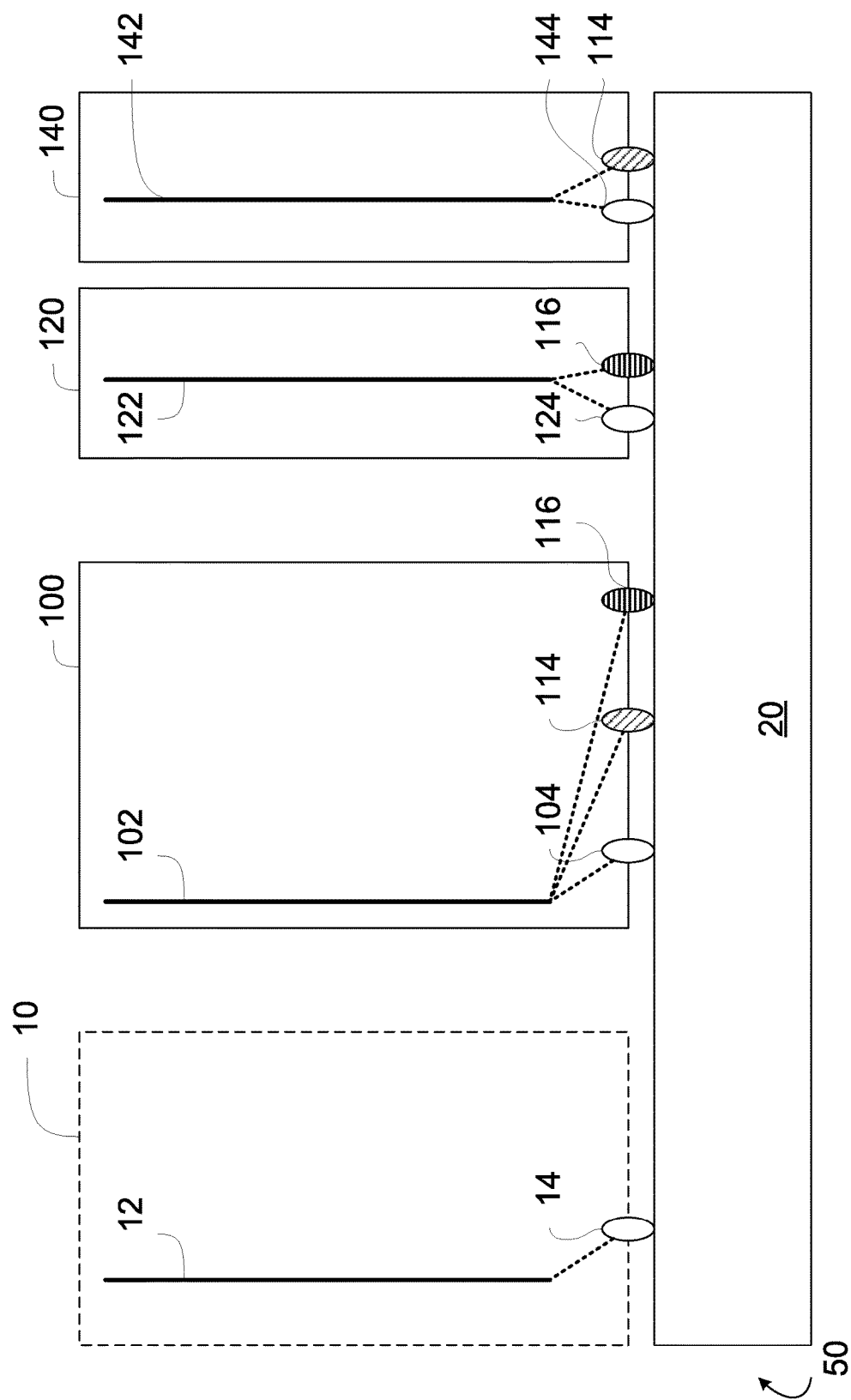

With reference to FIG. 8, in some embodiments, the first container 100 belongs to a container family, to which one or more additional containers belong. For example, containers 100 and 120 belong to a common family, but container 140 does not. In some such embodiments, different device files are used for inter-container IPCs depending on the target process. For example, process 102 can use device file 114 for inter-container IPCs generally, and device file 116 can be used for inter-container IPCs for process running in containers which belong to the same family as container 100. Thus, process 102 can use one of a plurality of device files for inter-container IPCs depending on the container in which the target process is running. For example, if process 102 outputs a request for an IPC with a process which runs in a container belonging to the same family as container 100, the IPC is routed through device file 116. Any number of containers can belong to a given container family, and the root container 10 and/or the host operating system may be configured for assigning a given container to a particular container family.

The container management system 50 and/or the method 400 described herein may be implemented in a high level procedural or object oriented programming or scripting language, or a combination thereof, to communicate with or assist in the operation of a computer system, for example the computing device 200. Alternatively, container management system 50 and/or the method 400 may be implemented in assembly or machine language. The language may be a compiled or interpreted language. Program code for implementing the container management system 50 and/or the method 400 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the container management system 50 and/or the method 400 may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Various aspects of the container management system 50 herein-disclosed may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

What is claimed is:

1. A method for inter-process communication, comprising:
    receiving a request from a requesting process running in a first container for communicating with at least one target process outside of the first container, the requesting process using a first device file;
    creating a second device file accessible by the first container; and
    routing a communication from the requesting process to the at least one target process outside of the first container through the second device file.

2. The method of claim 1, further comprising modifying an entry of an access control database associated with the second device file.

3. The method of claim 1, further comprising associating at least one security policy with the second device file.

4. The method of claim 1, wherein the second device file is accessible to the at least one target process.

5. The method of claim 1, wherein the at least one target process is running in one of a root container and a host operating system.

6. The method of claim 1, wherein the at least one target process outside of the first container comprises a plurality of target processes, and wherein routing comprises routing the communication to the plurality of target processes through the second device file.

7. The method of claim 6, wherein the plurality of target processes are running in a second container.

8. The method of claim 6, wherein at least a first target process of the plurality of target processes is running in a second container and at least a second target process of the plurality of target processes is running in a third container.

9. The method of claim 1, wherein the first container is one of a plurality of containers belonging to a container family, and the second device file is accessible to the plurality of containers belonging to the container family.

10. The method of claim 1, further comprising creating a matching requesting process in the first container and associated with the requesting process, the matching requesting process using the second device file, wherein routing a communication from the requesting process to the at least one target process outside of the first container comprises routing the communication through the matching requesting process.

11. A system for inter-process communication, comprising:
   a processing unit; and
   a non-transitory memory communicatively coupled to the processing unit and comprising computer-readable program instructions executable by the processing unit for:
      receiving a request from a requesting process running in a first container for communicating with at least one target process outside of the first container, the requesting process using a first device file;
      creating a second device file accessible by the first container; and
      routing a communication from the requesting process to the at least one target process outside of the first container through the second device file.

12. The system of claim 11, the program instructions being further executable for modifying an entry of an access control database associated with the second device file.

13. The system of claim 11, the program instructions being further executable for associating at least one security policy with the second device file.

14. The system of claim 11, wherein the second device file is accessible to the at least one target process.

15. The system of claim 11, wherein the at least one target process is running in one of a root container and a host operating system.

16. The system of claim 11, wherein the at least one target process outside of the first container comprises a plurality of target processes, and wherein routing comprises routing the communication to the plurality of target processes through the second device file.

17. The system of claim 16, wherein the plurality of target processes are running in a second container.

18. The system of claim 16, wherein at least a first target process of the plurality of target processes is running in a second container and at least a second target process of the plurality of target processes runs in a third container.

19. The system of claim 11, wherein the first container is one of a plurality of containers belonging to a container family, and the second device file is accessible to the plurality of containers belonging to the container family.

20. The system of claim 11, the program instructions being further executable for creating a matching requesting process in the first container and associated with the requesting process, the matching requesting process using the second device file, wherein routing a communication from the requesting process to the at least one target process outside of the first container comprises routing the communication through the matching requesting process.

* * * * *